J. J. COLLINS.
SPRING WHEEL.
APPLICATION FILED NOV. 1, 1908.

917,845.

Patented Apr. 13, 1909.

Witnesses
L. B. James
C. N. Griesbauer

Inventor
John J. Collins
by H. B. Willson &Co.
Attorneys

UNITED STATES PATENT OFFICE.

JOHN J. COLLINS, OF CLEMO, PENNSYLVANIA.

SPRING-WHEEL.

No. 917,845.　　　　Specification of Letters Patent.　　　Patented April 13, 1909.

Application filed November 1, 1906. Serial No. 341,620.

*To all whom it may concern:*

Be it known that I, JOHN J. COLLINS, a citizen of the United States, residing at Clemo, in the county of Wayne and State of Pennsylvania, have invented certain new and useful Improvements in Spring-Wheels; and I do declare the following to be a full, clear, and exact description of the invention, such as will enable others skilled in the art to which it appertains to make and use the same.

This invention relates to the class of wheels having yieldable tires, and more particularly to wheels for use in connection with automobiles and like vehicles, but which may also be employed in connection with other classes of vehicles, and has for its object to simplify and improve the construction and increase the efficiency and utility of devices of this character.

In the accompanying drawings forming a part of this specification and in which corresponding parts are denoted by like designating characters, is illustrated the preferred form of the embodiment of the invention capable of carrying the same into practical operation.

Figure 1:
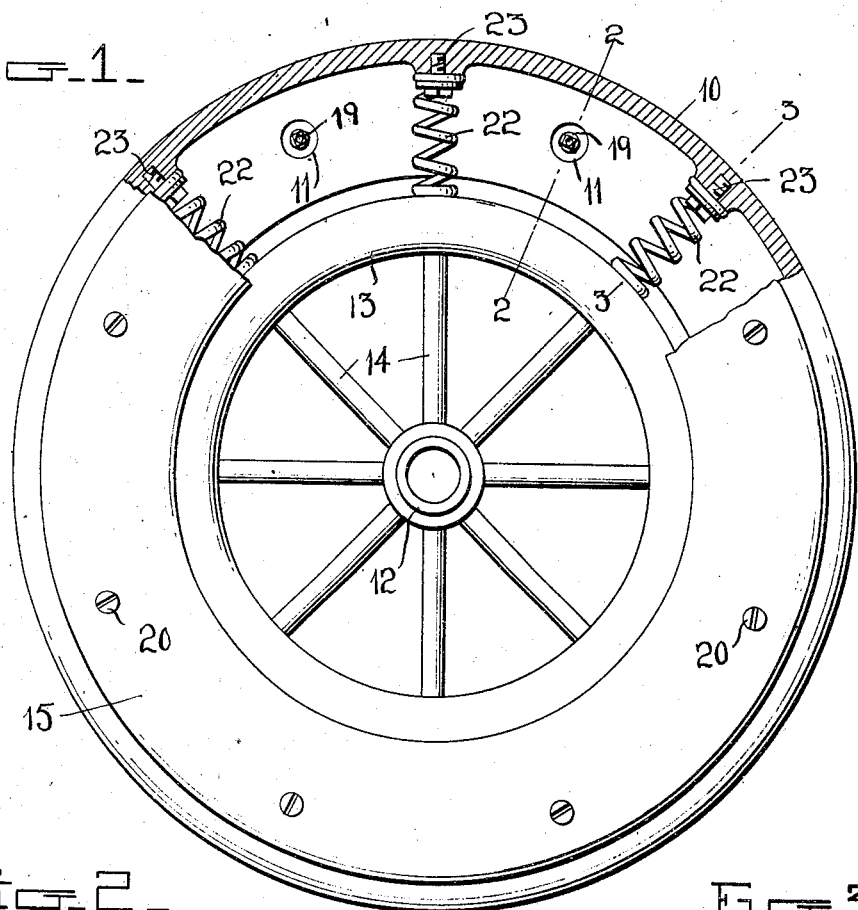
Figure 2:
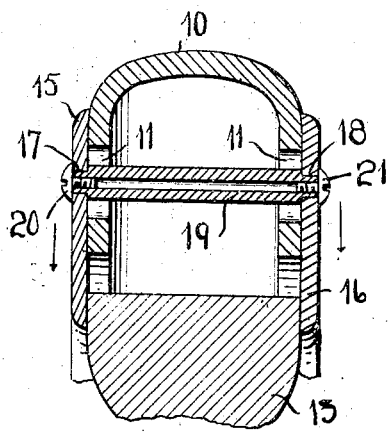
Figure 3:
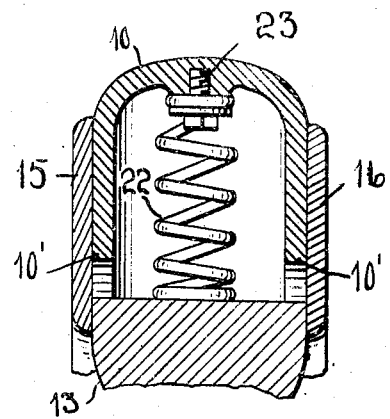

In the drawings,—Figure 1 is a side elevation, partly in section, of a wheel embodying the improved structure. Fig. 2 is a section, enlarged, on the line 2—2 of Fig. 1. Fig. 3 is a section, enlarged, on the line 3—3 of Fig. 1.

The improved device comprises an outer rim or tire, an inner wheel structure comprising a hub, spokes, and rim, a plurality of springs disposed between the tire and rim of the wheel structure, and clamp plates arranged on opposite sides of the tire and overlapping and slidable on the rim or felly of the wheel structure.

The tire structure of the device is formed of a single annular member 10, U-shaped in transverse section, and preferably composed of compressed steel, or other suitable material, and provided at suitable intervals with slots 11.

The wheel structure is of considerably less diameter than the tire and consists of the hub 12, rim or felly 13, and spokes 14 of any approved structure, the diameter of the felly of the wheel being sufficiently less than the internal diameter of the annular tire to leave a relatively large space between the two, as shown in Figs. 2 and 3.

Disposed upon the outer sides of the tire member 10 are clamp plates 15, 16, with their inner edges overlapping the outer portion of the felly 13, to completely cover the space between the felly 13 and the tire 10 to prevent the entrance of dirt and dust which would tend to fill the space between the tire and felly and prevent the free movement of the former, and provided respectively at suitable intervals with transversely alining apertures 17, 18, these apertures being preferably square or of other angular shape. The apertures 17, 18, are arranged to register with the slots of the tire so that connecting devices may be extended through the apertures and the slots to secure the plates 15, 16 in position relative to the tire. These devices, as shown, consist of bolts 19, preferably tubular, with the ends corresponding to and adapted to squarely engage the apertures 17, 18, so that when in position, the bolts 19 will not revolve. The bolts are internally threaded at their ends to receive clamp screws 20, 21, the latter having enlarged heads bearing against the outer faces of the plates 15, 16. The tires are thus movable relatively to the bolts 19, any required number of which and the corresponding slots 11 and apertures 17, 18, may be employed, but for an ordinary sized wheel, 8 sets of the bolts and their associated apertures and slots will be employed.

Springs 22 are disposed within the hollow tire 10 and between the tire and the felly 13 between each pair of the bolts 19, the outer ends of the springs being preferably coupled to the tire by clamp screws 23. Any number of the springs may be employed, but generally one spring will be used between each pair of the bolts, as indicated. The springs will be of sufficient strength to support the tire against compression under ordinary conditions, but will yield and produce a "cushioning" effect, as will be obvious when subjected to abnormal pressure when the vehicle is heavily loaded, the tire being resilient moves radially to the wheel in the same manner as does a pneumatic tire.

In the use of this wheel, the tire may be compressed against the tension of its springs sliding between the plates 15 and 16 until the outer walls of the slots 11 come in contact with the bolts 19 and said bolts with the plates through which they pass are pressed toward the hub, as shown by the arrows in Fig. 2. Under ordinary conditions, the pressure on the tire causes it to slide between the plates 15 and 16 a predetermined distance and when extraordinary conditions arise, such as heavy or unusual loading of a vehicle the outer walls of the slots 11 coming in contact with the bolts 19 permit the tire to be further compressed by forcing the plates inward on the felly 13, the space between the edges 10' and the periphery of the felly permitting this sliding action to take place. When the obstruction or weight is removed from the tire, the springs 22 force it outward again into normal position. This construction provides for the use of much narrower plates for the given movement than could be used if the tires only were made to slide within the plates thereby rendering the wheel much lighter.

The device is simple in construction, strong and durable, and may be inexpensively manufactured and applied to wheels having various forms of fellies.

While the device is more particularly designed for use in connection with the heavier class of automobiles, auto trucks or freight vehicles, it will also be of equal efficiency when employed in connection with the other classes of vehicles, such as carriages, buggies, and the like.

Having thus described the invention, what I claim as new is,—

1. The combination with a vehicle wheel, including a felly, of a tire U-shaped in cross section and provided with spaced slots, slidable annular clamping plates bearing upon the sides of said tire member and overlapping said felly, clamping devices secured at the ends of said plates and extending through said slots, and a plurality of springs bearing between said tire and felly.

2. The combination with a vehicle wheel, including a felly, of a tire U-shaped in cross section and provided with spaced slots, annular clamp plates bearing upon the sides of said tire member and overlapping and slidable on said felly, clamping devices secured at the ends of said plates and extending through said slots and slidable therein, and a plurality of springs secured at one end within said tire and bearing by their inner ends upon said felly.

In testimony whereof I have hereunto set my hand in presence of two subscribing witnesses.

JOHN J. COLLINS.

Witnesses:
ROBT. J. MURRAY,
PHILIP R. MURRAY.